US010849326B2

(12) United States Patent
Weiss

(10) Patent No.: US 10,849,326 B2
(45) Date of Patent: Dec. 1, 2020

(54) DEVICE FOR DISCHARGING BAKED GOODS

(71) Applicant: R. WEISS VERPACKUNGSTECHNIK GMBH & CO. KG, Crailsheim (DE)

(72) Inventor: Reinald Weiss, Schopfloch (DE)

(73) Assignee: R. WEISS VERPACKUNGSTECHNIK GMBH & CO. KG, Crailsheim (DE)

( * ) Notice: Subject to any disclaimer, the term of this patent is extended or adjusted under 35 U.S.C. 154(b) by 289 days.

(21) Appl. No.: 15/752,532

(22) PCT Filed: Aug. 9, 2016

(86) PCT No.: PCT/EP2016/068968
§ 371 (c)(1),
(2) Date: Feb. 13, 2018

(87) PCT Pub. No.: WO2017/025539
PCT Pub. Date: Feb. 16, 2017

(65) Prior Publication Data
US 2019/0008164 A1    Jan. 10, 2019

(30) Foreign Application Priority Data

Aug. 13, 2015    (DE) .................. 10 2015 113 398

(51) Int. Cl.
*A21B 3/07*        (2006.01)
*B65G 47/52*       (2006.01)
(Continued)

(52) U.S. Cl.
CPC ................ *A21B 3/07* (2013.01); *A21B 1/48* (2013.01); *A21C 9/083* (2013.01); *B65G 47/52* (2013.01);
(Continued)

(58) Field of Classification Search
CPC .... A21B 3/07; A21B 1/48; A21B 3/18; A01N 37/16; A61M 1/0058; A61M 1/0023;
(Continued)

(56) References Cited

U.S. PATENT DOCUMENTS 4,687,119 A     8/1987    Juillet
5,062,544 A  *  11/1991   Buzy-Vigneau ........ G07F 11/32
                                                      221/130

(Continued)

FOREIGN PATENT DOCUMENTS

DE        20302346 U1      4/2003
DE     102005012536 A1     9/2006
(Continued)

OTHER PUBLICATIONS

International Search Report dated Nov. 23, 2016 for PCT/EP2016/068968.

(Continued)

*Primary Examiner* — Sarang Afzali
(74) *Attorney, Agent, or Firm* — Kevin E. West; Advent, LLP

(57) ABSTRACT

Devices for discharging bakery goods, to be combined with an upstream continuous baking oven, are described. The device has transfer means for transferring bakery goods from a storage unit to discharging means, wherein the discharging means direct the bakery goods to a discharging compartment. The discharging means include a conveying installation and a dispensing installation, wherein the dispensing installation is suppliable by the conveying installation with bakery goods.

20 Claims, 4 Drawing Sheets

(51) Int. Cl.
  *B65G 47/64* (2006.01)
  *B65G 47/57* (2006.01)
  *A21B 1/48* (2006.01)
  *A21C 9/08* (2006.01)
  *A47F 3/02* (2006.01)

(52) U.S. Cl.
  CPC ........... *B65G 47/57* (2013.01); *B65G 47/644* (2013.01); *A47F 2003/021* (2013.01)

(58) Field of Classification Search
  CPC .............. A61M 1/0088; A61M 1/0084; A61M 2205/3344; A61M 2205/502; A61M 2205/52; A61M 2205/50; A21C 9/083; A61F 13/00017; A61F 13/00063; A61F 13/00068; A47F 2003/021; A61L 2300/212; A61L 26/0066; A61L 26/0085; B65G 47/57; B65G 47/52; B65G 47/644
  See application file for complete search history.

(56) References Cited

U.S. PATENT DOCUMENTS

| | | | |
|---|---|---|---|
| 6,739,445 B2 * | 5/2004 | Armstrong | B65G 47/647 198/435 |
| 8,827,068 B2 * | 9/2014 | Weiss | A21B 1/48 198/456 |
| 9,538,766 B2 * | 1/2017 | Weiss | A21B 7/00 |
| 2016/0205949 A1 * | 7/2016 | Weiss | A21B 3/07 |

FOREIGN PATENT DOCUMENTS

| | | |
|---|---|---|
| DE | 102005049193 A1 | 4/2007 |
| DE | 102005057866 A1 | 6/2007 |
| DE | 102009026620 A1 | 12/2010 |
| EP | 1680961 A2 | 7/2006 |
| EP | 1688042 A2 | 8/2006 |
| WO | 2015024999 A1 | 2/2015 |

OTHER PUBLICATIONS

German Search Report dated Jun. 22, 2016 for German Appl. No. 102015113398.9.

International Preliminary Report on Patentability dated Feb. 25, 2018 for PCT/EP2016/068968.

Notice of Reasons for Refusal for Japanese Patent Application No. 2018-527005, dated Sep. 23, 2020.

* cited by examiner

DEVICE FOR DISCHARGING BAKED GOODS

BACKGROUND

Devices of this type with a continuous baking oven being disposed upstream thereof are to be found, for example, in supermarkets. Various freshly baked or crisped bakery goods can be discharged by the discharging means upon customer demand by way of a button press. The device has a housing with a front panel that is directed toward the side of the customer, the discharging means and the storage unit being disposed there behind. Devices for discharging bakery goods can receive bakery goods from a continuous baking oven and by way of a revolving conveyor are pushed by means of slides onto a conveyor belt that leads to a rocker, on the one hand, and pushed directly onto this rocker, on the other hand. The rocker can be pivoted downward such that the bakery goods item slides into a discharging compartment. The rocker subsequently flaps upward again and can be resupplied with a bakery goods item from the conveyor belt or from the revolving conveyor. It is disadvantageous in the case of this embodiment that a plurality of operational steps such as, for example, supplying the rocker, downward pivoting, upward flapping again, re-supplying the rocker, etc., are required in order for a single bakery goods item to be discharged. The discharging procedure thus takes comparatively long in the case of a comparatively large number of bakery goods that are to be sequentially discharged at short intervals.

BRIEF DESCRIPTION OF THE DRAWINGS

The Detailed Description is described in the exemplary embodiments which follow. In the figures.

DETAILED DESCRIPTION

Figure 1:
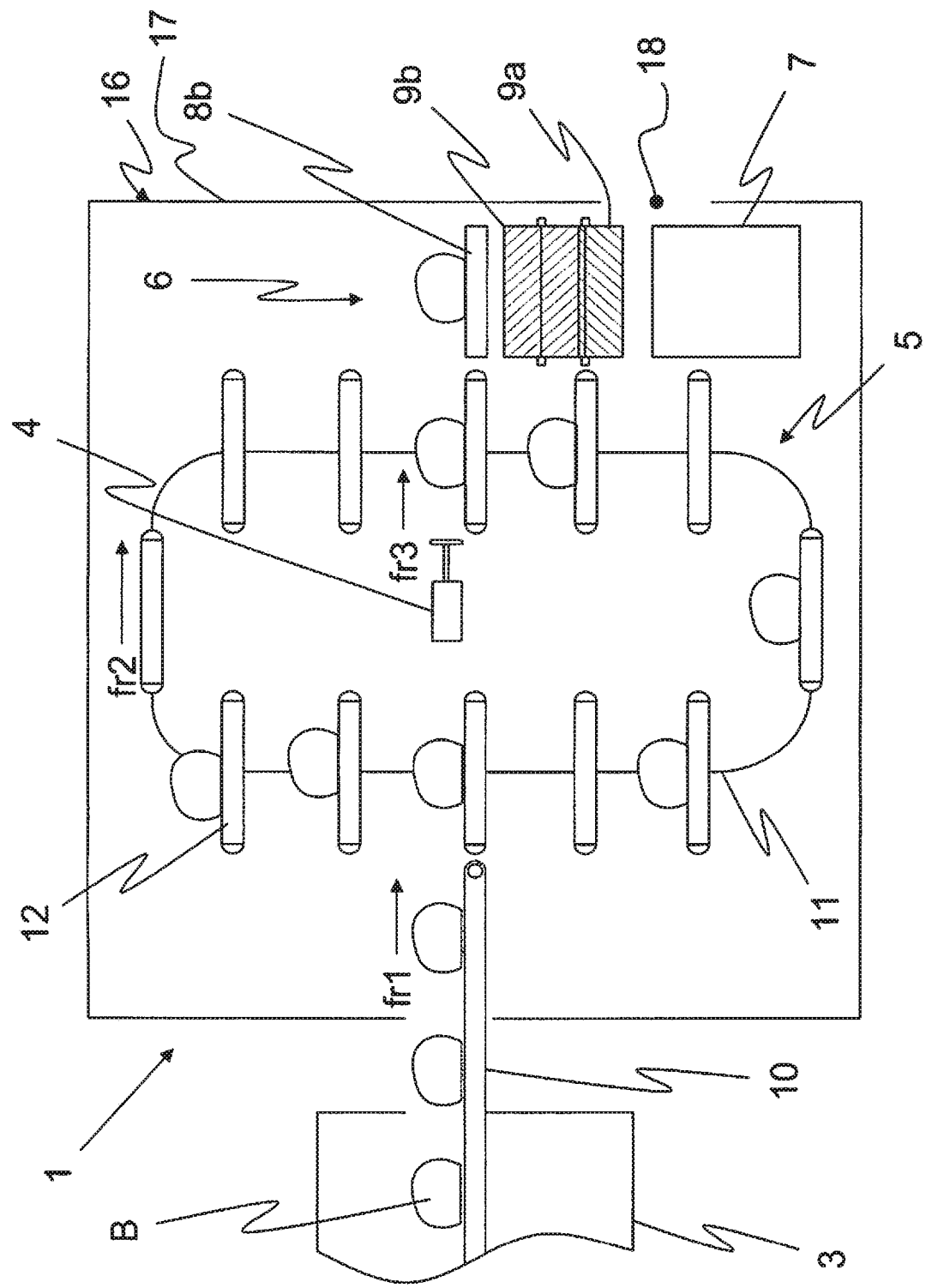
FIG. 1 shows a side view of a device for discharging bakery goods, and a continuous baking oven.

It is an object of the present disclosure to provide a device for discharging bakery goods which can discharge bakery goods more rapidly to a customer.

Proposed is a device for discharging bakery goods, to be combined with an upstream, continuous baking oven, which can be automatically supplied. The bakery goods are baked or crisped in the continuous baking oven such that fresh bakery goods are available to a customer at any time. The device moreover includes transfer means for transferring bakery goods from a storage unit to discharging means, wherein the discharging means direct the bakery goods to a discharging compartment. The crisped bakery goods are at least briefly temporarily stored in the storage unit such that sufficient bakery goods are on hand in the storage unit in the case of a comparatively large demand for bakery goods and the demand can be rapidly processed.

The discharging means according to the disclosure include at least one first conveying installation having a first dispensing installation and a second conveying installation having a second dispensing installation, wherein the dispensing installations are suppliable by the respective conveying installation with bakery goods. Both dispensing installations can assume at least one first and one second position. The first dispensing installation is configured in such a manner that said first dispensing installation in the first position thereof receives bakery goods from the first conveying installation, and in the second position thereof directs said bakery goods onward to the discharging compartment. The two dispensing installations according to the disclosure are configured and mutually disposed in such a manner that a bakery goods item is conveyed from the second dispensing installation in the second position thereof onto the first dispensing installation which herein can be in the first position thereof or likewise in the second position. In other words, dispensing is performed from the second outward conveying installation by way of the first outward conveying installation, such that the first outward conveying installation is used for both the outward conveyance with subsequent discharging of bakery goods of the first as well as of the second conveying installation. High throughput quantities in terms of the bakery goods are thus implementable, since the inward conveyance of bakery goods is possible by means of the first and of the second conveying installation. Controlling which bakery goods item is discharged by way of which outward conveying installation is preferably can be implemented by means of a correspondingly configured electronic control installation.

According to the disclosure, the bakery goods can be directed from the second dispensing installation directly onto the first dispensing installation. The at least two dispensing installations form a "dispensing chain", wherein a bakery goods item is directed from the second position of the second dispensing installation by way of the second position of the first dispensing installation in the direction of the discharging compartment. The other, shorter, dispensing chain provides that bakery goods are directed from the first dispensing installation to the discharging compartment. The second dispensing installation is not involved in this procedure.

On account of the configuration according to the invention of the conveying installations and of the dispensing installations, more bakery goods can be delivered to the discharging compartment in a shorter time. Moreover, the two conveying installations can be supplied independently of one another in particular with dissimilar bakery goods, this likewise increasing the discharging speed of the bakery goods.

Said independence offers even further advantages. For example, since the bakery goods can be directed to the discharging compartment by way of both dispensing installations or only by way of the first dispensing installation, the bakery goods, in the absence of bakery goods on one conveying installation, can be directed to the discharging compartment from the other conveying installation. There are thus more transportation paths available such that, even in the case of a failure of one conveying installation or of one dispensing installation, the bakery goods can still be directed to the discharging compartment by way of the other conveying installation and dispensing installation. Double the output is available when the two conveying installations and/or dispensing installations operate in parallel. Customer orders can thus be processed in a more rapid manner.

The conveying directions in which the bakery goods are conveyed by the first and the second conveying installation onto the respective assigned dispensing installation thereof, and the dispensing directions in which the bakery goods leave the first or the second dispensing installation, respectively, in the respective second position thereof, can lie in a common plane. This design embodiment is extremely space-saving and can be provided in particular along the rear side of the front panel of the housing of the device, wherein said conveying and dispensing installations run in the direction of the extent of the housing front. Respective storage and transfer means for the bakery goods can then be provided so as to be further inside the device.

In some embodiments, the first and the second conveying installation are disposed on top of one another and so as to be mutually parallel, wherein the first and the second dispensing installation, respectively, are disposed at an end of the first and the second conveying installation, respectively. Bakery goods can thus be transported on top of one another from the first conveying installation to the first dispensing installation, on the one hand, and from the second conveying installation to the second dispensing installation, on the other hand, then be transferred to the respective dispensing installation thereof and finally be discharged from the latter. To this end, the second dispensing installation is can be disposed above the first dispensing installation and can be laterally offset from the latter.

At least one, and in some embodiments both, of the conveying installations includes in each case one linear conveyor, in particular in each case one conveyor belt, by way of which the bakery goods are conveyed sequentially onto the associated dispensing installation. Such a design embodiment enables a rapid and safe transportation, wherein moreover the transfer to the respective dispensing installation is readily implementable. Moreover, the linear conveyors can be configured in a space-saving manner since the conveyor belts have only a minor height. The conveyor belts are controlled in a cycled manner since the dispensing installations during the movement thereof from the first position to the second position and back typically do not receive any bakery goods. To this end, the conveying installations are actuated in a preferably electronic manner in order for the bakery goods to be directed in a cycled manner onto the dispensing installations. The dispensing installations can additionally include sensors which identify the first and/or the second position such that the conveying installations direct bakery goods onto the respective dispensing installation again only once the sensors identify the first position of the dispensing installations.

The first position in the case of both dispensing installations can be configured as a receiving position in which the bakery goods are supplied by the respective associated conveying installation and held. The dispensing installation thus receives the bakery goods in the first or the receiving position, respectively, in which said bakery goods are stored until the latter by way of a movement of the dispensing installation can be directed onward from this first position.

In some embodiments, the second position in the case of both dispensing installations is configured as a dispensing position in which the bakery goods are directed onward, and that the dispensing installations are movable between the respective receiving position and the respective dispensing position. In principle, the bakery goods can thus be directed onward in the respective dispensing positions of the dispensing installations (if this is not momentarily prevented by downstream obstacles). After the movement of the respective dispensing installation from the first to the second position and, accordingly, the dispensing of the bakery goods item, the respective dispensing installation can be moved back into the first or the receiving position, respectively, again such that said dispensing installation can be resupplied with new bakery goods. Dispensing of the bakery goods can thus be tuned in temporal terms. Moreover, the receiving position forms a buffer store for the bakery goods such that the bakery goods can be stored therein and be more rapidly discharged so as to be able to process customer orders that are placed at rapid intervals more swiftly.

The dispensing installations for the movement between the receiving and the dispensing position include a drive that can be actuated by a central controller, wherein said drive can be configured, for example, as a servomotor, as a pneumatic and/or as a hydraulic piston.

In some embodiments, at least one and/or both of the dispensing installations has a bearing face on which the bakery goods bear in the first position or the receiving position, respectively, and from which the bakery goods in the second position or the dispensing position, respectively, are directed in the direction of the discharging compartment. The bakery goods can particularly readily slide without being damaged on the bearing face, in particular on a bearing face made from stainless steel. The bearing face herein can be dimensioned in such a manner that a plurality of bakery goods find space on the bearing face in the first or the receiving position, respectively, such that the dispensing of bakery goods can be further accelerated. A customer thus receives the bakery goods desired by him/her in a short time. However, receiving only one bakery goods item is also readily possible and is desirable in specific cases.

The at least first and second dispensing installation can include in each case one pivoting element, in particular a pivoting arm or a rocker. These pivoting elements by way of a pivoting movement direct the bakery goods from the first to the second position. The bakery goods item can be directed directly into the discharging compartment when the pivoting element of the first dispensing installation is pivoted. The pivoting elements herein can have in each case one bearing face on which the bakery goods item bears in the respective receiving position. The pivoting element of the second dispensing installation thereupon can pivot to the dispensing position such that the bakery goods item slides from the bearing face in the direction toward the first dispensing installation. The pivoting element of the first dispensing installation can pivot to the dispensing position such that the bakery goods item slides from the bearing face in the direction toward the discharging compartment. The pivoting element herein, depending on the arrangement, can rotate in a clockwise or counter-clockwise direction and is thus configured in a very space-saving manner. Said pivoting element by means of a drive is can be rotatable between the receiving and the dispensing position.

The two dispensing installations are disposed on top of one another and laterally mutually offset in such a manner that the bearing faces of said two dispensing installations in the respective second position or the dispensing position thereof, respectively, configure two inclined, parallel, and/or mutually aligned, planes. When both dispensing installations are in the second position, the bakery goods can thus slide across both bearing faces of the dispensing installations in the direction of the discharging compartment. The bearing faces of the two dispensing installations can form a single inclined plane, such that a bakery goods item is directed across the two bearing faces, in particular at the transition thereof, in a gentle manner and without damage. The bakery goods by means of this inclined plane can be directed in a simple manner in the direction of the discharging compartment.

In some embodiments, the bearing face in the first position of at least one of the dispensing installations, or of both dispensing installations, is inclined in relation to the conveying direction of the associated conveying installation and bakery goods are transported by the associated conveying installation onto said inclined bearing face. On account of the incline it is possible that the bakery goods, optionally while additionally bearing on an upright retention wall, in the first position of the respective dispensing installation rest securely on the respective bearing face of said bakery goods, before said bakery goods in the second position of said respective dispensing installation are transported onward.

The above-mentioned inclined arrangements of the bearing faces of the first and/or of the second dispensing installation (when receiving the bakery goods, on the one hand, when dispensing the bakery goods, on the other hand) can be aligned in such a manner that the bearing faces, when pivoting from the respective first position (receiving position) thereof to the second position (dispensing position) and back, in each case cross a horizontal plane. The respective bakery goods item herein slides downward when the respective bearing face on the way to the second dispensing position crosses the horizontal plane.

In the case of one embodiment, two dispensing installations are mutually disposed in such a manner that the bearing faces thereof are moved in opposite directions from the receiving position to the dispensing position. The dispensing installations herein are disposed on top of one another, a compact construction thus being able to be implemented. When the dispensing installations are moved counter to one another, the bakery goods can moreover be directed from dissimilar, in particular opposite, directions to the discharging compartment. In an analogous manner, the conveying installations can transport bakery goods to the dispensing installations and supply the latter likewise from dissimilar, in particular opposite, directions. For example, bakery goods from two or more dissimilar storage units and/or from two or more dissimilar continuous baking ovens can thus be directed to the discharging compartment. The output of the devices can thus be increased. Moreover, the storage units can contain dissimilar bakery goods such that customer orders having a plurality of types of bakery goods can also be more rapidly processed.

In the case of one embodiment, at least two dispensing installations are disposed beside one another. Additionally or alternatively, at least two conveying installations can also be disposed beside one another. The dispensing installations and/or the conveying installations by means of the transfer means can thus be supplied with bakery goods by two storage units, for example. In particular, various types of bakery goods can be kept available in the storage units.

In the case of one further exemplary embodiment of the invention, both positions, specifically the first and the second position, of the second dispensing installation are configured in such a manner that the latter in the first position thereof directs bakery goods to the first dispensing installation, and in the second position of said second dispensing installation directs bakery goods to a further dispensing installation. No pure receiving position of the second dispensing installation may be provided in the case of this embodiment. Instead, a bakery goods item which is directed from the second conveying installation to the second dispensing installation is immediately conveyed onward, specifically to the first dispensing installation or to a further dispensing installation, depending on the position of said second dispensing installation. The second dispensing installation can be configured, for example, as a pivoting arm which can be pivoted between the first and the second position.

A further configuration of the disclosure provides that the storage unit is configured as a revolving conveyor which includes a multiplicity of revolving carriers for storing the baked bakery goods. The revolving conveyor herein can be supplied with bakery goods by a continuous baking oven. A sufficient number of bakery goods that can be directed to the discharging compartment are thus available at all times. Additionally or alternatively, the continuous baking oven per se can also form the storage unit. In this embodiment, the device can be configured in an even more space-saving manner and that the bakery goods can be delivered to the customer when particularly fresh.

The transfer means which transport bakery goods from the storage unit or storage units to the conveying installations can include a plurality of controlled slides. The slides can be configured in a cost-effective manner and on account of the movement in only one direction have a minor space requirement. The slides can be actuated electronically, hydraulically, and/or pneumatically.

Alternatively or additionally, the transfer means can include drop-off means by means of which the bakery goods can be dropped off from the carriers of the revolving conveyor. The drop-off means can be configured as stoppers such that the carrier is tilted at the stopper and the bakery goods slide down from the carrier.

In some embodiments, the transfer means include an intermediate store for the bakery goods, the bakery goods being transported from said intermediate store to the conveying installation. The capacity of the device and the availability of bakery goods can thus be increased.

In some embodiments, the first and/or the second conveying installation and the respective associated dispensing installation are disposed beside one another and correspond substantially to the width of the carriers of the revolving conveyor.

In the case of one refinement of the disclosure, two conveying directions for bakery goods to the first and/or to the second dispensing installation are provided, by way of a direct conveyance from one of the transfer means onto the dispensing installation, on the one hand, and by a conveyance from a conveying installation as described above onto the dispensing installation, on the other hand, wherein these two conveying installations run so as to be substantially mutually perpendicular. The compactness of the device can be increased on account thereof.

FIG. 1 shows a side view of a device 1 for discharging bakery goods B, having an upstream continuous baking oven 3. The bakery goods B (of which, for the sake of simplicity, at all times only one bakery goods item is identified by a reference sign) are continuously freshly crisped in the continuous baking oven 3 and by way of a conveyor belt 10 make their way from the continuous baking oven 3 to a storage unit 5. The bakery goods B on the conveyor belt 10 are conveyed from the continuous baking oven 3 in the conveying direction fr1 in the direction toward a storage unit 5.

The device 1 is accommodated in a housing 16 which has a front panel 17, which is, or has been, respectively, directed toward the customer side in a supermarket, and in particular has information boards, bakery goods ordering/operating elements, and a retrieving opening 18 for access to the discharged bakery goods. The housing 16, the front panel 17, and the retrieving opening 18 are illustrated only in FIG. 1.

The storage unit 5 is presently configured as a revolving conveyor 11 having a plurality of carriers 12 disposed thereon. The revolving conveyor 11 in the conveying direction fr2 moves on a revolving, endless track. Bakery goods B can be transported and temporarily stored on the carriers 12. When a bakery goods item B reaches a transfer means 4, the former can be pushed by the latter in the conveying direction fr3 from the carrier 12. The transfer means 4 in this exemplary embodiment is embodied as a slide which by means of a push movement in the conveying direction fr3 pushes the bakery goods B from the carrier 12 onto the discharging means 6.

Alternatively, the continuous baking oven 3, in particular the conveyor belt 10, can also be used as a storage unit 5. The revolving conveyor 11 and the carriers 12 could thus be dispensed with so as to configure the device 1 in an even more space-saving manner.

The discharging means 6 include a first conveying installation 8a and a second conveying installation 8b (of which only the second conveying installation 8b is shown in this side view), and one first dispensing installation 9a which is assigned to the first conveying installation 8a, and a second dispensing installation 9b which is assigned to the second conveying installation 8b, said dispensing installations directing the bakery goods B onward to a discharging compartment 7. The conveying installations 8a, 8b are presently configured as conveyor belts which convey bakery goods in the conveying direction fr4 (cf. FIG. 2), wherein the conveying direction fr4 is aligned so as to be perpendicular to the conveying direction fr3.

Figure 2:
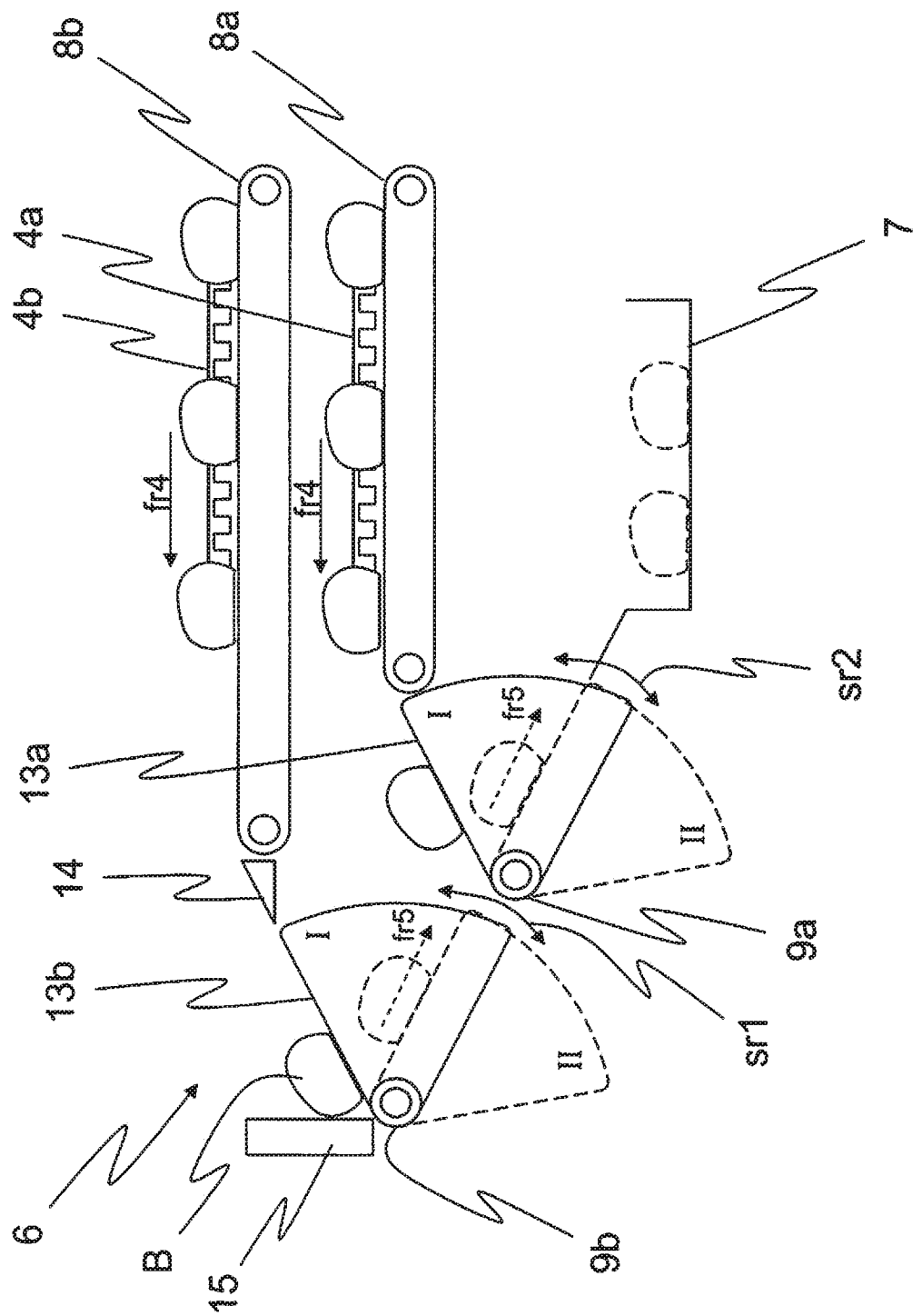
FIG. 2 shows a front view of discharging means of a device for discharging bakery goods.

FIG. 2 shows a front view of discharging means 6 of a device 1 for discharging bakery goods B, wherein this device 1 can correspond in particular to that of FIG. 1. The discharging means 6 in this exemplary embodiment include the two conveying installations 8a, 8b, and the two dispensing installations 9a, 9b. The conveying installations 8a, 8b are again configured as conveyor belts such that the bakery goods B can be directed in the conveying direction fr4 in the direction of the dispensing installations 9a, 9b which are disposed on a common end of the two conveying installations 8a, 8b. The bakery goods B by the transfer means 4a, 4b, which presently are configured as slides, are pushed from the storage unit 5 (cf. FIG. 1) onto the conveying installations 8a, 8b. This exemplary embodiment has two transfer means 4a, 4b such that bakery goods B can be pushed from two carriers 12 (cf. FIG. 1) of the storage unit 5 onto the conveying installations 8a, 8b. The slides have a width of such a type that presently three bakery goods items B can be displaced. In an alternative exemplary embodiment, the slides can also be configured so as to be wider or narrower such that more or fewer bakery goods B are displaceable (of course also depending on the length of the latter).

On account of the movement in the conveying direction fr4, the bakery goods B make their way to the dispensing installations 9a, 9b which in each case have one bearing face 13a, 13b for receiving the bakery goods B. The bearing faces 13a, 13b herein can be dimensioned in such a manner that a plurality of bakery goods B find space thereon. A further movement of the bakery goods B in particular onto the bearing face 13b is delimited by means of a delimiting element 15. The delimiting element 15 in this exemplary embodiment is configured as a separate component of the device 1. Alternatively, the delimiting element 15 could also be configured as part of the dispensing installation 9b.

Furthermore, an optional ramp element 14 is disposed between the conveying installation 8b and the dispensing installation 9b, said ramp element 14 bridging a spacing between said conveying installation 8b and said dispensing installation 9b, wherein the bakery goods B are directed across the ramp element 14.

The dispensing installations 9a, 9b in this exemplary embodiment are disposed on top of one another and laterally mutually offset, and are configured as pivoting elements, in particular as rockers. The dispensing installations 9a, 9b according to FIG. 2 (illustration with solid lines) are oriented in each case in a first position or a receiving position I, respectively, such that the bakery goods B are held and bear on the bearing faces 13a, 13b. The dispensing installations 9a, 9b by means of pivoting in the pivoting directions sr1, sr2 are movable (dashed illustration) to a second position or dispensing position II, respectively, wherein the bakery goods B in a self-acting manner slide across the bearing faces 13b, 13a in the conveying direction fr5 into the discharging compartment 7, the bakery goods B being retrievable by the customer therein. The two bearing faces 13a, 13b herein are mutually aligned and configure an inclined plane along which the bakery goods slide into the discharging compartment. The two pivoting directions sr1, sr2 herein are in each case identically oriented, that is to say that both dispensing installations 9a, 9b in each case pivot in the same rotating direction from the receiving position I to the dispensing position II, while by way of the bearing faces 13a, 13b thereof in each case crossing a horizontal plane.

The two conveying directions fr4 and fr5 presently lie in a common plane which runs behind the front panel 17 of the housing 16 (this applies to all exemplary embodiments shown in FIGS. 1 to 4). On account of this design embodiment, the device can be constructed having a very minor depth such that only a correspondingly minor set-up area for the device 1 is required in a supermarket or similar.

In particular, the two dispensing installations 9a, 9b are disposed in such a manner that the bakery goods B are directed from the dispensing installation 9b directly onto the dispensing installation 9a. The bakery goods B by means of this arrangement are gathered by the two conveying installations 8a, 8b such that the dispensing installations 9a, 9b and the conveying installations 8a, 8b occupy particularly little space.

In the exemplary embodiment in FIG. 2, a plurality of transportation paths for the bakery goods B can be configured. For example, bakery goods B can only be delivered from the storage unit 5 to the conveying installation 8b. The bakery goods by means of the conveyor belt of the conveying installation 8b are then directed in the conveying direction fr4 by way of the ramp element 14 to the dispensing installation 9b. The bakery goods B, by means of pivoting the dispensing installation 9b from the receiving position I to the dispensing position II, slide across the bearing face 13b. The dispensing installation 9a herein can be always oriented in the dispensing position II such that the bakery goods B also slide across the bearing face 13a and are directed into the discharging compartment 7. Here too, the two bearing faces 13a, 13b of the two dispensing installations 9a, 9b that are located in the dispensing position II configure a common inclined plane along which the bakery goods slide into the discharging compartment 7.

A parallel operation of the conveying installations 8a, 8b and of the dispensing installations 9a, 9b is moreover also implementable. When both dispensing installations 9a, 9b are supplied with bakery goods B, both pivot to the dispensing position II such that both can simultaneously release their bakery goods B. The bakery goods herein slide sequentially into the discharging compartment 7. The output of the device 1 can thus be substantially doubled.

It is an additional advantage of the dispensing installations 9a, 9b that the bakery goods B are received in a gentle manner from the conveying installations 8a, 8b.

Figure 3:
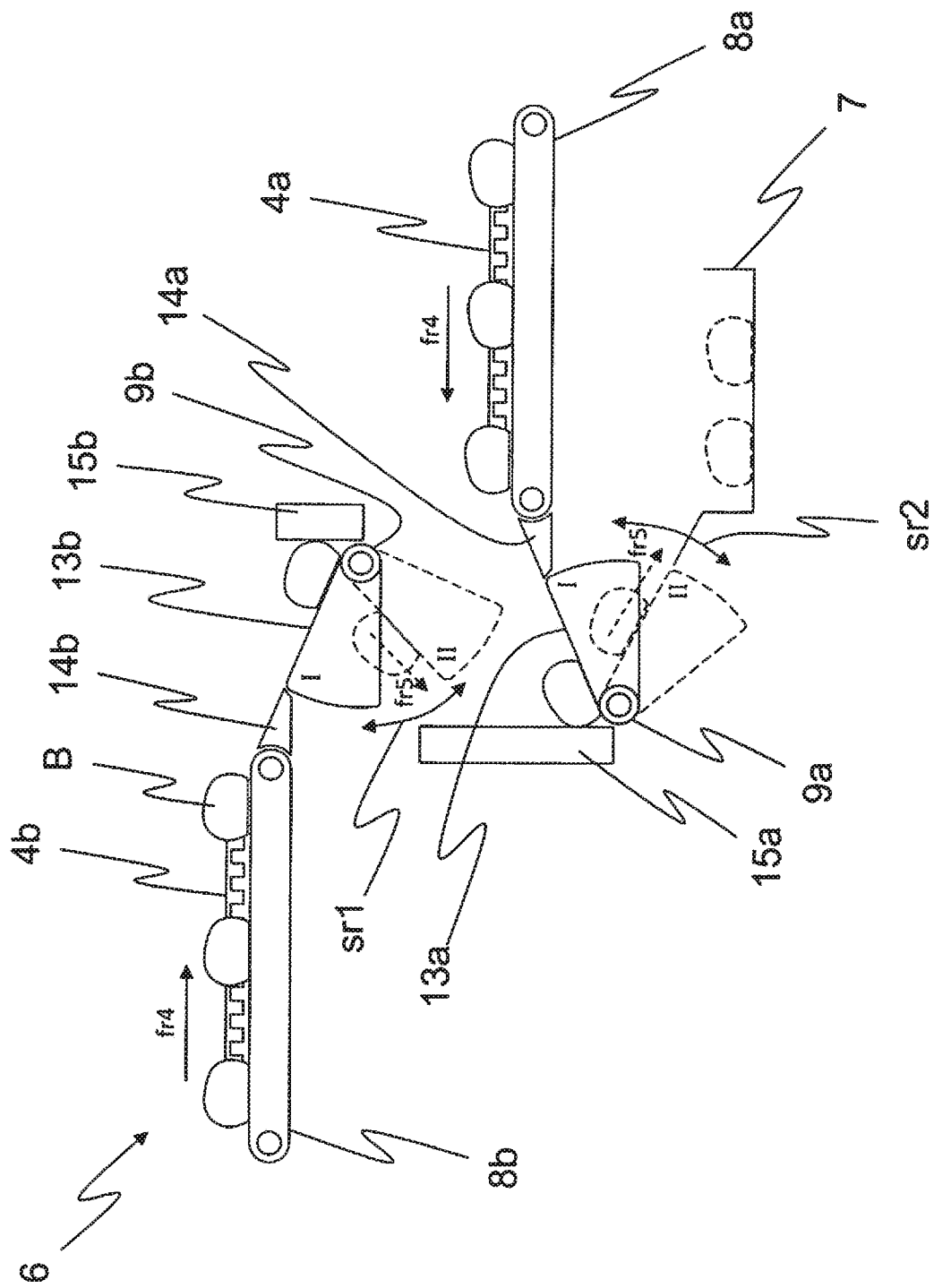
FIG. 3 shows a front view of a further embodiment of discharging means of a device for discharging bakery goods.

FIG. 3 shows a front view of a further embodiment of discharging means 6 of a device 1 for discharging bakery goods B. The discharging means 6 include a first conveying installation 8a and a second conveying installation 8b, and a first and a second dispensing installation 9a, 9b. The two dispensing installations 9a, 9b are presently disposed on top of one another, while the conveying installations 8a, 8b are also disposed at dissimilar heights but laterally mutually offset, wherein the two feeding directions fr4 to the two dispensing installations 9a, 9b are opposed. The conveying installations 8a, 8b convey the bakery goods B in the conveying directions fr4 across the respective ramp elements 14a, 14b onto the bearing faces 13a, 13b of the dispensing installations 9a, 9b which are located in the receiving positions I thereof. The dispensing installations 9a, 9b in this exemplary embodiment are configured as pivoting elements, in particular as rockers, which by the respective pivoting directions sr1, sr2 are pivotable between the respective receiving position I thereof and a dispensing position II. The two pivoting directions sr1, sr2 in this exemplary embodiment are in opposite rotating directions when both dispensing installations 9a, 9b are pivoted from the receiving position I to the dispensing position II.

For example, if a bakery goods item B is disposed on the bearing face 13b of the dispensing installation 9b, the dispensing installation 9b can be pivoted downward to the dispensing position II, and the bakery goods item B slides from the bearing face 13b in the conveying direction fr5. The bakery goods item B comes to rest on the bearing face 13a and by means of the delimiting element 15a is prevented from sliding down from the bearing face 13a of the dispensing installation 9a in the receiving position I. Additionally or alternatively, a bakery goods item B can already bear on the bearing face 13a such that a second bakery goods item B is added by the procedure just described.

Alternatively, also only one bakery goods item B can be directed from the conveying installation 8a in the conveying direction fr4 onto the dispensing installation 9a, the former by pivoting the dispensing installation 9a from the receiving position I to the dispensing position II being directed into the discharging compartment 7.

As has been described above, the conveying installations 8a, 8b in the exemplary embodiment according to FIG. 3 are disposed so as to be offset in terms of height as well as laterally offset such that the bakery goods B can make their way from two different storage units 5 onto the conveying installations 8a, 8b. In this embodiment, the two storage units 5 can be supplied with dissimilar bakery goods B such that different types of bakery goods can simultaneously be directed to the discharging compartment 7. This accelerates a discharging procedure of dissimilar bakery goods B from the device 1.

Figure 4:
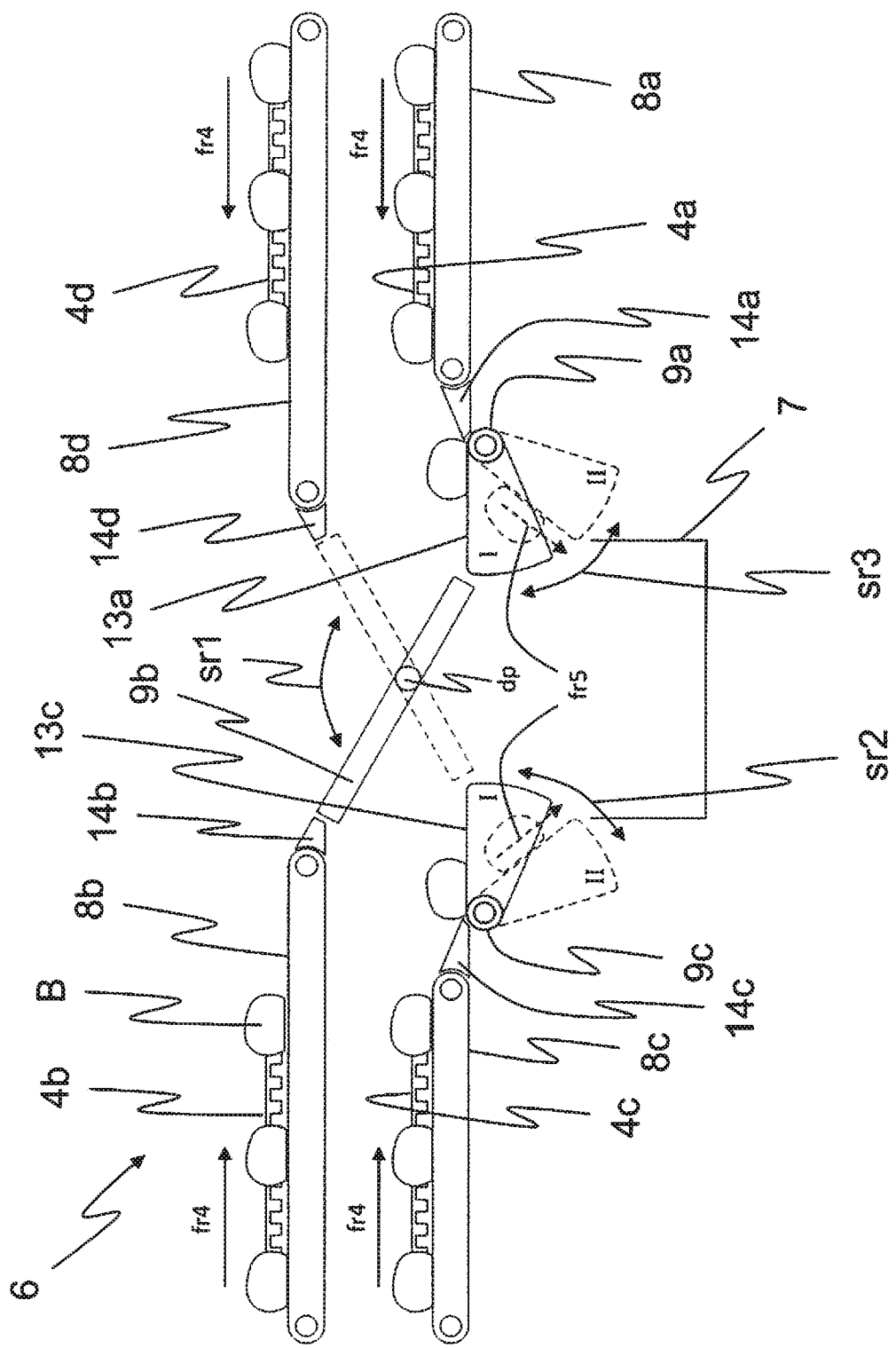
FIG. 4 shows a front view of a further embodiment of discharging means of a device for discharging bakery goods, having four conveying installations and three dispensing installations.

FIG. 4 shows a front view of a further embodiment of discharging means 6 of a device 1 for discharging bakery goods B, having four conveying installations 8a, 8b, 8c, 8d and three dispensing installations 9a, 9b, 9c. The conveying installations 8b, 8c are disposed on top of one another and disposed so as to be adjacent to the conveying installations 8d, 8a which are likewise disposed on top of one another. In this embodiment, the two conveying installations 8b, 8c, and the two conveying installations 8d, 8a, can in each case be supplied by two different storage units 5, optionally with different types of bakery goods B.

The dispensing installation 9b in this exemplary embodiment is configured as a rotary element that can be rotated about a center of rotation dp. The bakery goods B by means of the dispensing installation 9b can be directed from the conveying installation 8b to the dispensing installation 9a that is disposed so as to be diagonal to the latter, such that said bakery goods B bear on the bearing face 13a and are held in the receiving position I of the dispensing installation 9a. The dispensing installation 9b in the pivoting direction sr1 (dispensing installation 9b illustrated with dashed lines) can be rotated such that the dispensing installation 9b directs the bakery goods B from the conveying installation 8d to the dispensing installation 9c that is disposed so as to be diagonal to the latter. The bakery goods B bear on the bearing face 13c and are held in the receiving position I of the dispensing installation 9c.

The dispensing installations 9a and 9c, respectively, can likewise be supplied in the manner described above with bakery goods B from the conveying installations 8a and 8c, respectively. If the bakery goods B are located on the bearing face 13a, 13c of the dispensing installations 9a, 9c, said bakery goods B can be moved in the pivoting directions sr2, sr3 in the direction of the discharging compartment 7 such that the bakery goods B by way of the bearing faces 13a, 13c are directed in the conveying direction fr5 into the discharging compartment 7. The bakery goods B therein are retrievable by the customer, for example through a retrieving opening 18.

In the exemplary embodiment of FIG. 4, a plurality of transportation paths for bakery goods B from storage units 5 to the discharging compartment 7 are thus possible. For example, bakery goods B can be directed continuously onto the conveying installation 8a and be directed by way of the dispensing installation 9a to the discharging compartment 7. In a manner parallel therewith, bakery goods B can be directed from the conveying installation 8d by way of the dispensing installation 9b or by way of the conveying installation 8c to the dispensing installation 9c. The bakery goods B, by pivoting the dispensing installation 9c, can then likewise be directed into the discharging compartment 7. An absence of bakery goods B on one conveying installation 8a, 8b, 8c, 8d can thus also be compensated for by another transportation path without the customer having to wait for the bakery goods B for a comparatively long time. In particular, by pivoting the dispensing installation 9b, conveying to the dispensing installation 9a by means of the conveying installation 8b can be switched to conveying to the dispensing installation 9c by means of the conveying installation 8d.

The present disclosure is not limited to the exemplary embodiments illustrated and described. Modifications within the scope of the patent claims are possible as is a combination of the features, even when the latter are illustrated and described in different exemplary embodiments.

LIST OF REFERENCE SIGNS

1 Device for discharging baked goods
3 Continuous baking oven
4a-4d Transfer means
5 Storage unit
6 Discharging means
7 Discharging compartment
8a-8d Conveying installation
9a-9c Dispensing installation 10 Conveyor belt
11 Revolving conveyor
12 Carrier
13a-13b Bearing face
14a-14d Ramp element
15l,15b Delimiting element
16 Housing
17 Front panel
18 Retrieving opening
SR Pivoting direction
I Receiving position
II Dispensing position
fr1 Conveying direction
fr2 Conveying direction
fr3 Conveying direction
fr4 Conveying direction
fr5 Conveying direction
sr1 Pivoting direction
sr2 Pivoting direction
sr3 Pivoting direction
dp Center of rotation
B Bakery goods

What is claimed is:

1. A device for discharging bakery goods, to be combined with an upstream continuous baking oven, the device comprising:
 a storage unit for storing the bakery goods;
 a discharging device for directing the bakery goods to a discharging compartment, wherein the discharging device includes:
  a first conveying installation and a first dispensing installation, the first dispensing installation positionable in at least a first and at least a second position, wherein the first dispensing installation in the at least a first position thereof is suppliable by the first conveying installation with at least one of the bakery goods in order for said first dispensing installation upon being moved to the at least a second position thereof to dispense the at least one of the bakery goods to the discharging compartment;
  at least a second conveying installation and at least a second dispensing installation, the at least a second dispensing installation positionable in at least a first and at least a second position, wherein the first dispensing installation and the at least a second dispensing installation are mutually disposed in such a manner that the at least one of the bakery goods is conveyable from the at least a second dispensing installation in the at least a second position thereof onto the first dispensing installation and, in the at least a second position of the first dispensing installation, from there to the discharging compartment; and
 a transfer element for transferring the bakery goods from the storage unit to the discharging device.

2. The device for discharging baked goods of claim 1, wherein each of the first dispensing installation and the at least a second dispensing installation include a bearing face on which the bakery goods bear in the respective at least a first position.

3. The device for discharging baked goods of claim 2, wherein the first dispensing installation and the at least a second dispensing installation are disposed on top of one another and laterally mutually offset in such a manner that the bearing faces of the first dispensing installation and the at least a second dispensing installation in the respective at least a second position thereof form two inclined mutually aligned planes such that the bakery goods are directed across the respective bearing faces of the first dispensing installation and the at least a second dispensing installation in a direction of the discharging compartment.

4. The device for discharging baked goods of claim 2, wherein the first dispensing installation and the at least a second dispensing installation are disposed on top of one another such that the respective bearing faces are moved in an opposite manner from a respective receiving position to a respective dispensing position.

5. The device for discharging baked goods of claim 1, wherein at least a first conveying direction in which the bakery goods are conveyed by the first conveying installation and the at least a second conveying installation onto the first dispensing installation or at least a second dispensing installation, respectively, and at least one dispensing direction in which the bakery goods leave the first dispensing installation or the at least a second dispensing installation, respectively, lie in a common plane.

6. The device for discharging baked goods of claim 5, wherein at least one of the first dispensing installation in the at least a first position or the at least a second dispensing installation in the at least a first position include a bearing face on which the bakery goods bear, the bearing face being inclined in relation to the at least one conveying direction of at least one of the first conveying installation or the at least a second conveying installation, such that the bakery goods are transported by the at least one of the first conveying installation or the at least a second conveying installation onto the inclined bearing face.

7. The device for discharging baked goods of claim 1, wherein the at least a first position of the first dispensing installation and the at least a first position of the at least a second dispensing installation are configured in a receiving position in which the bakery goods are supplied by the first conveying installation and the at least a second conveying installation, respectively, and held, and wherein the at least a second position of the first dispensing installation and the at least a second position of the at least a second dispensing installation are configured in a dispensing position in which the bakery goods are directed onward.

8. The device for discharging baked goods of claim 7, wherein the first dispensing installation and the at least a second dispensing installation are movable in a reciprocating manner between the receiving position and the dispensing position.

9. The device for discharging baked goods of claim 1, wherein the storage unit comprises a revolving conveyer, the revolving conveyor including a multiplicity of revolving carriers for storing the bakery goods.

10. The device for discharging baked goods of claim 9, wherein the transport element comprises a drop-off element for receiving the bakery goods from at least one carrier of the multiplicity of revolving carriers.

11. The device for discharging baked goods of claim 1, wherein the first conveying installation and the at least a second conveying installation are disposed on top of one other and are mutually parallel in that the first dispensing installation and the at least a second dispensing installation, respectively, are disposed at a common end of the first conveying installation and the at least a second conveying installation, respectively.

12. The device for discharging baked goods of claim 1, wherein at least one of the first conveying installation or the at least a second conveying installation include a linear conveyor for conveying the bakery goods sequentially onto at least one of the first dispensing installation or the at least a second dispensing installation.

13. The device for discharging baked goods of claim 1, wherein at least one of the first dispensing installation or the at least a second dispensing installation has a bearing face, the bearing face for bearing the bakery goods in the at least a first position of the at least one of the first dispensing installation or the at least a second dispensing installation, and from which the bakery goods are directed in a direction of the discharging compartment in the at least a second position of the at least one of the first dispensing installation or the at least a second dispensing installation.

14. The device for discharging baked goods of claim 1, wherein the bearing face crosses a horizontal plan when pivoting from the at least a first position of the at least one of the first dispensing installation or the at least a second dispensing installation to the at least a second position of the at least one of the first dispensing installation or the at least a second dispensing installation and back.

15. The device for discharging baked goods of claim 1, wherein each of the first dispensing installation and the at least a second dispensing installation comprise a pivoting element which by way of a pivoting movement move the respective each of the first dispensing installation and the at least a second dispensing installation from the at least a first position to the at least a second position.

16. The device for discharging baked goods of claim 1, wherein at least one of the first dispensing installation and the at least a second dispensing installation or the first conveying installation and the at least a second conveying installation are disposed beside one another.

17. The device for discharging baked goods of claim 1, wherein the at least a second dispensing installation in the at least a first position and the at least a second position is capable of directing the baker goods to the first dispensing installation, and the second dispensing installation in the at least a second position is capable of directing the bakery goods to a further dispensing installation.

18. The device for discharging baked goods of claim 1, wherein the storage unit is part of a continuous baking oven.

19. The device for discharging baked goods of claim 1, wherein a conveying direction of the bakery goods from the transfer element to at least one of the first conveying installation or the at least a second conveying installation runs in a substantially perpendicular manner to a conveying direction from the at least one of the first conveying installation or the at least a second conveying installation to at least one of the first dispensing installation or the at least a second dispensing installation.

20. The device for discharging baked goods of claim 1, wherein the transfer element comprises a plurality of slides for sliding the bakery goods on to at least one of the first dispensing installation, the at least a second dispensing installation, the first conveying installation, or the at least a second conveying installation.

* * * * *